(12) United States Patent
Kosuch (10) Patent No.: US 6,349,441 B1
(45) Date of Patent: Feb. 26, 2002

(54) MOBILE BRIDGE FOR ACCESSING AIRCRAFT

(75) Inventor: Norbert Kosuch, Rosengarten (DE)

(73) Assignee: DaimlerChrysler Aerospace Airbus GmbH, Hamburg (DE)

( * ) Notice: Subject to any disclaimer, the term of this patent is extended or adjusted under 35 U.S.C. 154(b) by 0 days.

(21) Appl. No.: 09/413,727

(22) Filed: Oct. 6, 1999

(30) Foreign Application Priority Data

Oct. 6, 1998 (DE) ......................................... 198 45 892

(51) Int. Cl.[7] .................................................. E04G 3/10
(52) U.S. Cl. ........................... 14/69.5; 182/36; 182/150
(58) Field of Search ........................... 182/150, 36, 37, 182/38, 39, 115, 130, 141, 142; 52/111, 117, 123.1, 124.1, 125.1, 125.2

(56) References Cited

U.S. PATENT DOCUMENTS

| 414,843 | A | * | 11/1889 | Olsen | 14/2.4 |
|---|---|---|---|---|---|
| 3,465,846 | A | * | 9/1969 | Jacobsen | 52/64 |
| 3,711,881 | A | * | 1/1973 | Chapman et al. | 14/71 |
| 3,814,211 | A | * | 6/1974 | Pamer | 182/14 |
| 4,108,277 | A | * | 8/1978 | Goldstein et al. | 182/82 |
| 4,403,362 | A | * | 9/1983 | Durrant | 14/71.1 |
| 4,453,283 | A | * | 6/1984 | Fitzgerald-Smith et al. | 14/2.4 |
| 4,965,903 | A | * | 10/1990 | Bisch | 14/1 |
| 5,152,370 | A | * | 10/1992 | Silberman | 182/130 |
| 5,375,283 | A | * | 12/1994 | Silberman | 14/69.5 |
| 5,381,575 | A | * | 1/1995 | Silberman | 14/69.5 |
| 5,701,704 | A | * | 12/1997 | Landes | 52/64 |

FOREIGN PATENT DOCUMENTS

| DE | 1756763 | 5/1970 | | |
|---|---|---|---|---|
| DE | 4420502 | 12/1995 | | |
| EP | 0626339 | 11/1994 | | |
| GB | 1236471 | * 6/1971 | ............. | B64F/5/00 |
| WO | WO96/00166 | 1/1996 | | |

* cited by examiner

Primary Examiner—Thomas B. Will
Assistant Examiner—Raymond W Addie
(74) Attorney, Agent, or Firm—W. F. Fasse; W. G. Fasse (57) ABSTRACT

A mobile access bridge provides access to the doors and the exterior surface of an aircraft fuselage in the final stages of construction, assembly, and outfitting. The access bridge includes catwalks preferably arranged at several levels, in pairs on opposite sides of the aircraft. The bridge further includes bridge supports that each have an arched inverted U-shape. The bridge supports are connected to and carry the catwalks, and respectively arch over the top of the aircraft fuselage. The bridge may be made up of a number of bridge segments that are coupled together as needed by coupling units. The entire bridge or each individual bridge segment is lifted at a lifting fixture by an overhead crane or lifting cable, is then moved into position, and then lowered onto the aircraft fuselage. The bridge is entirely supported on or at least partly braced against the aircraft fuselage by padding elements or spacer elements that are provided on the inner arch of each bridge support and that rest in contact on the exterior of the fuselage.

29 Claims, 2 Drawing Sheets

MOBILE BRIDGE FOR ACCESSING AIRCRAFT

PRIORITY CLAIM

This application is based on and claims the priority under 35 U.S.C. §119 of German Patent Application 198 45 892.4, filed on Oct. 6, 1998, the entire disclosure of which is incorporated herein by reference.

FIELD OF THE INVENTION

The invention relates to a mobile bridge or dock structure allowing an unobstructed access to the exterior of an aircraft fuselage and to the doors of a stationary aircraft, in order to facilitate installation and maintenance work on or in the aircraft, as well as the access of persons and/or goods into or out of the aircraft fuselage.

BACKGROUND INFORMATION

It is generally known in the art to provide bridge, dock or scaffolding structures (generally called bridge structures herein) that can be movably positioned relative to the fuselage of a stationary aircraft, and particularly a multi-deck large capacity commercial aircraft. Such bridge structures are especially used during the construction and/or outfitting of a passenger aircraft in an assembly hangar or the like, in order to facilitate the performance of various assembly, equipping and outfitting procedures by workers, while providing the greatest possible unobstructed access to the exterior areas of the fuselage as well as free unobstructed access into the interior of the fuselage. Such a bridge structure can also advantageously allow for the entry or exit of persons into or out of the aircraft, as well as the loading or unloading of goods into or out of the aircraft while it is stationarily parked.

Generally, the conventional bridge structures comprise platforms carried by apparatus that stand on the ground or are otherwise supported on the ground and can be moved into position adjacent the aircraft fuselage. Additional ground-supported access arrangements are also known, for example providing work platforms at several levels. It is also known to provide work platforms that are movably supported from the ceiling of an assembly hall or painting hall, for carrying out particular work such as painting, adjustments, and repairs on the exterior of the aircraft fuselage. Such ceiling-supported work platforms can be controllably moved into the proximity of the respective required various external areas of the fuselage skin. It is also known to use rigid and fixed arrangements such as multi-level scaffolding or platforms that are fixedly supported on the ground or floor of a maintenance or assembly hangar or the like in order to facilitate various assembly or outfitting operations on or in the aircraft fuselage. To use such fixed platforms or scaffold arrangements, the aircraft fuselage or individual fuselage sections are moved into position relative to the fixed platforms or scaffolding and are then secured in position.

Present conventional arrangements that allow the unobstructed access to many doors or other areas of the aircraft, especially in connection with large aircraft having a correspondingly large height above the ground or correspondingly large spacing distances relative to fixed platforms or work decks, all suffer serious disadvantages. Also, the conventional procedures that are necessary for moving such arrangements into position and then later removing these arrangements from the aircraft for the docking and undocking of the aircraft fuselage similarly give rise to disadvantages. For example, these conventional systems all require rather high manufacturing costs, a considerable expenditure of time and effort for the docking and undocking procedures, a high loading capacity of the floor of the hangar or maintenance hall in which they are installed due to the high weight of the arrangement, and highly developed transport systems as well as a rather smooth floor surface to allow the known arrangements to be moved into position and then again retracted for the docking and undocking procedure with respect to the aircraft fuselage.

Published European Patent Application 0,626,339 (Albert Landes-MERO-Raumstruktur GmbH & Co.) discloses an arrangement based on an overhead crane that carries a lowerable working platform structure. A vertically positioned guide beam hangs downward from and is supported by the crane trolley or carriage that runs along the overhead beam of the crane, and a stroke shaft is vertically movable up and down without rotation along the guide beam. The stroke shaft carries and selectively moves one or more working platforms which are thus vertically and horizontally as well as rotatably movable on the stroke shaft. This arrangement is used especially for aircraft maintenance procedures such as the above mentioned painting, adjustment and repair procedures. However, such an arrangement is rather complicated and costly, and does not provide continuous simultaneous access to large areas of the aircraft fuselage, and therefore is not suitable for facilitating the construction, installation and outfitting of a passenger aircraft fuselage under construction.

German Patent Laying-Open Document 44 20 502 and corresponding U.S. Pat. No. 5,701,704 (Landes) disclose a docking arrangement especially for maintenance and overhaul operations to be performed on an aircraft fuselage. The arrangement includes two side dock parts that are respectively carried by an overhead crane to be movable along the exterior of the aircraft fuselage. A bridge is provided to selectively provide a locking connection between the two dock side parts when the two side parts are moved close to each other in their working position relative to the aircraft. Such an arrangement suffers similar disadvantages as the arrangement of European Patent Application 0,626,339 discussed above.

PCT International Patent Publication WO 96/00166 discloses a maintenance dock arrangement including several dock segments that are suspended and lifted by lifting equipment into positions adjacent and along an aircraft fuselage. The docking segments respectively form bridges or bridge catwalks that extend horizontally and parallel relative to each other on opposite sides of an aircraft fuselage, in parallel to the lengthwise axis of the aircraft fuselage. The lifting equipment requires a complicated combination of various lifts and cranes that are movably supported on the floor or hanging from the ceiling of the maintenance hangar. Such an arrangement generally suffers the disadvantages discussed above.

German Patent Laying-Open Document 1,756,763 and corresponding U.S. Pat. No. 3,465,846 (Jacobson) disclose an arrangement including a plurality of working decks or platforms that are movably supported from an overhead crane extending along the ceiling of a maintenance hangar. A respective work platform is provided on each side of the aircraft fuselage, and is supported by a supporting structure hanging from the overhead crane above the aircraft fuselage. An access ladder incorporated in the supporting structure arches over the top of the aircraft to interconnect the work platforms on opposite sides of the aircraft. A clearance spacing between the arrangement and the aircraft is maintained and ensured by photocells that monitor this clearance spacing. The disadvantages discussed above generally apply to this conventional arrangement as well.

SUMMARY OF THE INVENTION

In view of the above, it is an object of the invention to provide a mobile bridge arrangement that is able to provide an unobstructed access simultaneously to all door areas of an aircraft fuselage and particularly a multi-deck large capacity aircraft, and which extends along the lengthwise extension of the aircraft to enable the simultaneous performance of various work procedures on the exterior of the aircraft fuselage. It is a further object of the invention to provide such a bridge arrangement that achieves an advantageous and simplified docking and undocking of the arrangement relative to the aircraft fuselage, while the arrangement also has a simpler construction, reduced manufacturing costs, and a reduced total weight in comparison to the prior known arrangements. The bridge arrangement shall be particularly applicable for facilitating the construction, installation, and outfitting procedures during the final construction stages of an aircraft by allowing an unobstructed access to all of the doors and adjoining fuselage exterior areas of the aircraft fuselage, and simultaneously allowing persons to enter into and exit from the fuselage and goods to be loaded into or unloaded from the fuselage. The invention further aims to avoid or overcome the disadvantages of the prior art, and to achieve additional advantages, as apparent from the present specification.

The above objects have been achieved by a mobile bridge arrangement according to the invention, comprising a plurality of bridge supports, and a plurality of bridge catwalks extending horizontally and parallel to each other and to the lengthwise axis of the fuselage. Two respective catwalks across from each other on opposite sides of the aircraft fuselage form a catwalk pair, which is supported by a respective one of the bridge supports. To achieve this, the bridge supports extend crosswise relative to the lengthwise axis of the fuselage, are spaced apart from each other along the lengthwise axis of the fuselage, and respectively comprise curved structural supporting arches having a curved or arching shape that substantially matches the exterior cross-sectional shape of the aircraft fuselage at the location of the respective bridge support. Thereby, the bridge catwalks on opposite sides of the aircraft are both supported and carried by the bridge supports that arch over the top of the aircraft fuselage.

Once the arrangement is moved into position above the aircraft fuselage, for example by an overhead crane or cable hoist, the arrangement is then lowered down onto the aircraft fuselage. Particularly, at this time, pads or cushions provided on the bottom surface of the arching configuration of the bridge supports rest in contact against the exterior surface of the aircraft fuselage and thereby support the entire weight and load of the bridge supports on the fuselage, or at least brace and secure the bridge supports against the fuselage.

BRIEF DESCRIPTION OF THE DRAWINGS

In order that the invention may be clearly understood it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figures 1, 2, 2A, 2B, 3:
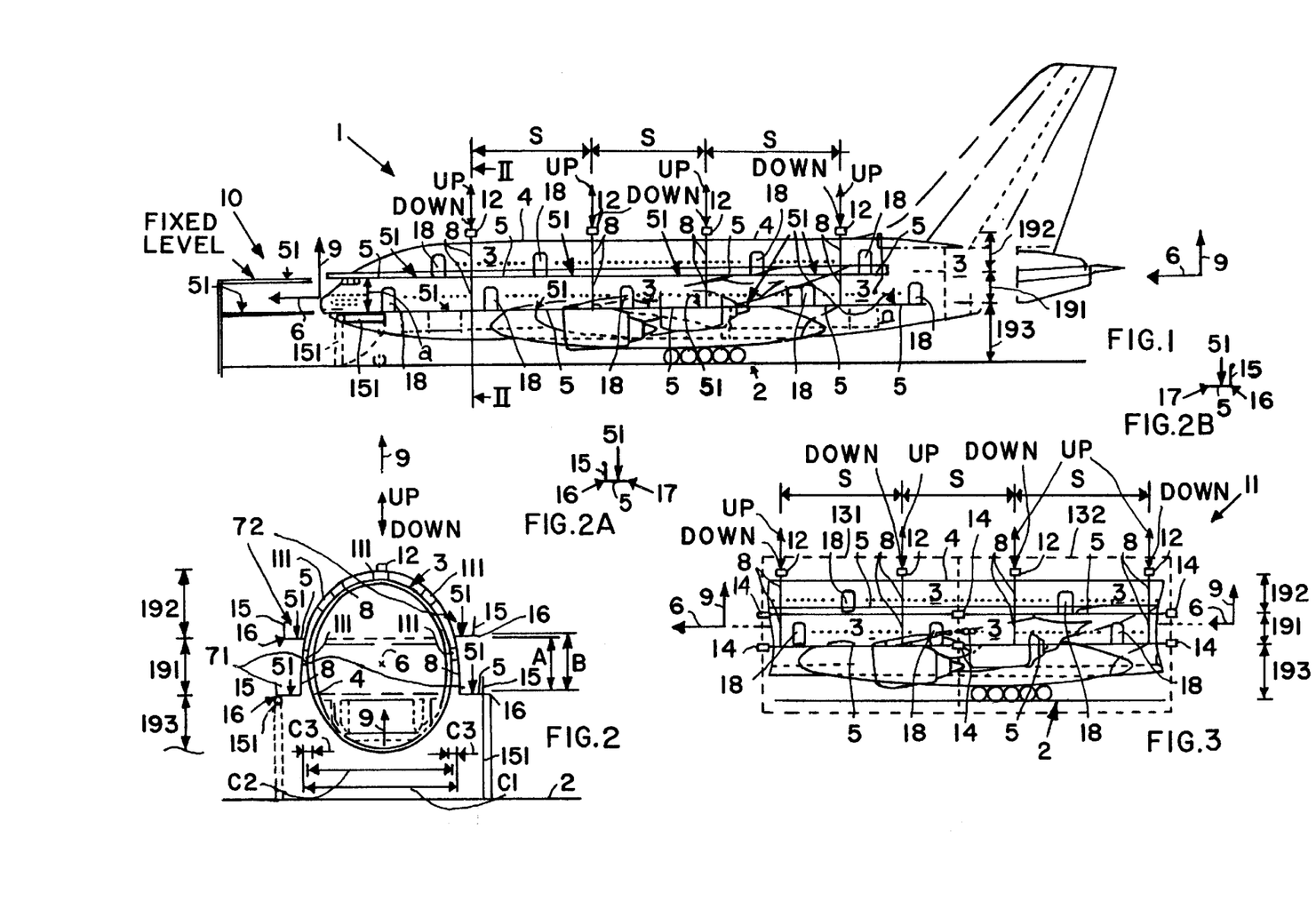
FIG. 1 is a schematic side view of an aircraft fuselage with a one-piece access bridge supported thereon according to the invention.
FIG. 2 is a schematic cross-sectional view taken along section line II—II in FIG. 1.
FIG. 2A is an enlarged schematic detail view of a bridge catwalk including a safety railing that is to be arranged along the left side of the aircraft fuselage.
FIG. 2B is a view similar to that of FIG. 2A, but shows a bridge catwalk with a safety railing that is to be arranged along the right side of the aircraft fuselage.
FIG. 3 is a schematic side view of a part of an aircraft with a portion or section of an access bridge that is integrally formed from two bridge segments coupled to each other.

FIG. 1 schematically shows an aircraft fuselage 4 of a multi-deck high capacity commercial transport aircraft that is in the final stage of construction, namely it is located at a fixed position within an assembly hangar or the like so that various assembly and installation procedures can be carried out on the interior and the exterior of the fuselage 4. FIG. 1 further schematically shows a mobile one-piece access bridge 1 that has been positioned and set down onto the fuselage exterior 3 of the aircraft fuselage 4, so that the access bridge 1 is supported, either entirely or at least partly, on the fuselage 4. FIG. 2 shows the cross-section through the above mentioned components along the line II—II shown in FIG. 1.

Generally, as shown in FIGS. 1 and 2, the access bridge 1 includes a plurality of arched bridge supports 8 and at least one bridge catwalk 5 on each side of the aircraft fuselage 4. Each bridge support 8 essentially comprises a structural support arch substantially having a "horseshoe" or inverted U-shape including a top arch and two downwardly extending side legs (for example fabricated of metal sectional members), and the several bridge supports 8 are spaced apart along the lengthwise axis of the aircraft fuselage and are secured to the respective bridge catwalks 5. Each bridge catwalk 5 includes a walking deck or surface 51 and a safety railing 15 extending upwardly along a lengthwise edge 16 of the catwalk 5 oriented away from the aircraft fuselage 4. The two respective bridge catwalks 5 arranged on the left side and on the right side of the aircraft fuselage 4 are shown in isolation or in detail in FIGS. 2A and 2B. The safety railings 15 provide a degree of safety for the workers, with an aim to prevent workers from falling off of the walking surface or deck 51 of the catwalk 5 as they are walking on the catwalk 5 to work on the fuselage exterior 3 or to access the interior of the fuselage through the aircraft doors 18. The walking deck 51 of each catwalk 5 may be embodied as a solid plate 4, or as a grid or grating platform. Another safety railing or the like may also be provided on the inner side of each catwalk, i.e. along the inner edge 17 of the catwalk, along the aircraft fuselage. Such an inner railing would have passage openings as necessary at the locations of the aircraft doors 18. The particular details of the construction of the access bridge 1 will be discussed further below.

FIG. 3 shows a mobile bridge section or portion 11 that is assembled or integrated from two bridge segments 131 and 132, which are coupled to each other by respective coupling units 14 installed at the respective opposite facing ends of the respective two bridge catwalks 5 of the corresponding bridge segments 131 and 132. By means of the coupling units 14, a respective required number of the bridge segments 131 and 132 can be successively coupled to one another to form respective bridge portions 11, and then such bridge portions 11 can be coupled with or decoupled from each other to complete a multi-piece bridge 1 having a variably selectable length to match the requirements in any given application, i.e. for use with any given size of aircraft on which the bridge is to be arranged. In any case, FIG. 3 shows the bridge portion 11 in its operating condition or position, set down onto the aircraft fuselage 4.

Figure 4:
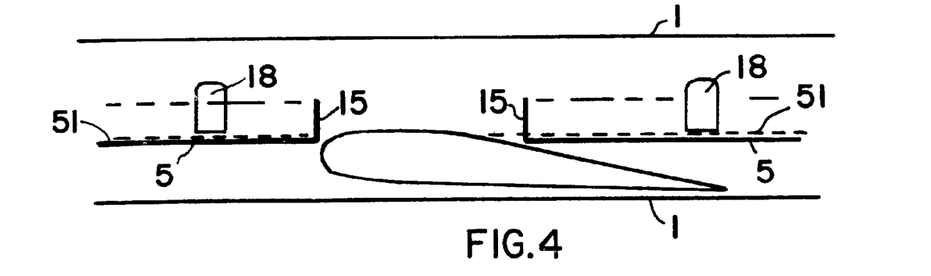
FIG. 4 is a schematic side view showing first and second catwalks interrupted by an aircraft wing.

Generally, the access bridge 1 according to FIGS. 1 and 2, or the individual bridge portions 11 according to FIG. 3, respectively comprise a plurality of bridge catwalks 5 that are arranged extending horizontally and parallel to each other at a given spacing distance therebetween. The bridge catwalks 5 thus extend parallel to the direction of the lengthwise axis 6 of the aircraft fuselage 4, with respective catwalks 5 arranged parallel to each other on opposite sides of the aircraft fuselage 4 forming a so-called catwalk pair 71 or 72. In this context, the catwalk pair 71 is at a lower level, while the catwalk pair 72 is at a higher level relative to the aircraft fuselage 4, to respectively provide access by workers to corresponding lower and higher door openings or portions of the aircraft fuselage. The catwalks 5 on each side of the aircraft may be continuous or may be interrupted at an area of the aircraft wing, as schematically shown in FIG. 4.

The bridge 1 or bridge portions 11 further comprise a plurality of curved or arched bridge supports 8 that comprise structural support arches having a curved configuration that substantially matches the exterior curved shape of the fuselage cross-section, e.g. an oval shape in the embodiment according to FIG. 2 or a circular shape or a paraboloid shape, at the specific lengthwise location at which the respective bridge support 8 is arranged on the aircraft fuselage 4. The bridge supports 8 extend crosswise relative to the fuselage lengthwise axis 6 so as to arch over the top of the aircraft fuselage 4. The bridge supports 8 are respectively spaced apart from one another along the lengthwise axis 6 and are secured to the bridge catwalks 5 so as to support or carry the catwalks 5. Once the overall bridge 1 or bridge portions 11 have been moved into the final operating position as shown in FIG. 2, the bridge supports 8 arch over and around the upper portion of the fuselage exterior 3 extending down to the bottom door threshold of the lowest aircraft door 18.

The catwalks 5 are preferably secured to each of the bridge supports 8 in a mechanical manner, for example by means of bolting, riveting, and/or welding, whereby the catwalks 5 of the upper pair 72 are joined to the bridge supports 8 respectively at cross-butt joints, while the catwalks 5 of the lower pair 71 are respectively joined to the bridge supports 8 at respective T-butt joints.

The above described bridge construction is positioned and lowered down onto the aircraft fuselage to be braced and supported thereon. For this purpose, padding or cushion elements 111 are provided spaced apart from one another along the arched underside of each bridge support 8 along a contour line corresponding to the outer contour of the aircraft fuselage 4 at the respective lengthwise location of the respective bridge support 8. The padding or cushion elements 111 comprise a rubber or other elastomeric material, or a synthetic foam or the like to provide a certain degree of adaptation between the arched configuration of the bridge support 8 and the arched contour of the fuselage exterior 3, and to prevent any damage from being inflicted on the fuselage when the bridge 1 is set down thereon. The contact surface area of each padding or cushion element 111 and the number and distribution of elements 111 is properly selected to achieve the required degree of weight distribution over the fuselage exterior 3. Also, the bridge supports 8 are preferably positioned along the fuselage corresponding to the positions of major structural frames of the fuselage for proper weight transfer and loading onto the airframe without damaging the fuselage skin.

In order to position the bridge 1 or bridge portions 11 onto the fuselage 4 and then again remove the bridge 1 or bridge portions 11 from the fuselage 4, corresponding carrying elements or lifting fixtures 12 are secured to the bridge supports 8. For example, the carrying elements or lifting fixtures 12 can be embodied as respective hanging hooks, lugs, eyes, or loops that are respectively secured to the apex point of each bridge support 8. Alternatively, a plurality of such elements 12 can be distributed along each bridge support while being centered about the apex point mentioned above. These carrying elements 12 serve as coupling points for an autonomous lifting or moving apparatus such as an overhead crane, that is movably installed along the ceiling of the assembly hangar. For example, lifting cables supported from an overhead crane can be hooked into the respective carrying elements 12 by means of conventional lifting hooks or the like in order to lift and move the entire bridge construction 1 into position and then lower the bridge construction 1 onto the aircraft fuselage 4 after the aircraft has been parked in its proper location in the hangar.

The embodiment of the access bridge 1 shown in FIGS. 1 and 2 comprises four bridge catwalks 5 arranged in two pairs 71 and 72 and four bridge supports 8 supporting the catwalks 5. FIG. 1 naturally shows only two of the four catwalks 5 arranged at two respective heights or levels along the left side of the fuselage, while the two remaining catwalks 5 are not visible because they are on the opposite or right side of the aircraft fuselage. Nonetheless, it is clear from FIG. 2 that the catwalks 5 on the right side are respectively arranged at the same upper and lower levels as the two catwalks 5 shown in FIG. 1 on the left side of the fuselage.

FIG. 2 shows that the catwalks 5 of the lower pair 71 are spaced apart from each other at a wider spacing C1, while the catwalks 5 of the upper pair 72 are spaced apart from each other at a narrower horizontal spacing C2 since they are arranged at a narrower cross-section of the aircraft fuselage. Particularly, the catwalk spacing C2 corresponds to the horizontal exterior width of the aircraft fuselage at the respective height or level of the upper catwalks, plus the operating thickness of the respective padding or cushioning elements 111 provided between the bridge supports 8 and the fuselage exterior 3. The lower catwalk spacing C1 is wider than the corresponding fuselage cross-sectional width at the respective level of the lower catwalk pair 71, and instead corresponds to the width of the widest portion of the fuselage at the respective vertical plane plus the operating thickness of the padding elements 111. This is necessary to provide the required clearance to allow the bridge structure to be lowered onto the aircraft fuselage from above, whereby the lower catwalk pair 71 must clear the widest width of the fuselage. This extra clearance requirement results in a gap C3 that will be discussed below.

The lower pair 71 and upper pair 72 of catwalks 5 are spaced apart from each other vertically by a so-called catwalk height or level spacing A. The vertical catwalk spacing A correlates to the vertical door threshold spacing B of the several aircraft doors 18 distributed over the multi-deck aircraft, so that the respective walking surfaces 51 of the catwalks 5 are substantially flush with or at the same level as the thresholds of the aircraft doors 18 on different levels, thereby providing access to a lower deck and to an upper deck of the aircraft respectively. Also, one of the pairs of catwalks 5, such as the upper pair 72 of catwalks 5 in the illustrated embodiment, is at the same level and extends flush relative to a fixed access platform 10 that is provided in the assembly hangar. The two pairs 71 and 72 of catwalks 5 respectively provide two access ranges 191 and 192 for accessing the right-hand and left-hand fuselage exterior 3. The lower one of these two access ranges 191 is bounded by the catwalk spacing A between the catwalks 5 of the lower catwalk pair 71 and the upper catwalk pair 72, while the upper access range 192 extends upwardly from the catwalks 5 of the upper catwalk pair 72 substantially to the top of the aircraft fuselage. The lowest portion or belly portion of the fuselage is in a range 193 that is not accessible from the catwalks 5, but instead is accessible from the floor 2 of the maintenance or assembly hangar. The vertical spacings referred to herein are understood with reference to the aircraft vertical axis 9, for example.

As shown in FIG. 1, the respective bridge supports 8 are spaced apart from one another along the lengthwise axis 6 of the aircraft fuselage, by respective spacing distances S. The horizontal spacing distance S can be of a different size or dimension for respective successive bridge supports 8, but in the illustrated embodiment happens to be a constant or uniform spacing S. In any event, the spacing S is selected to correspond to the arrangement of aircraft doors 18 in the aircraft fuselage 4, so that the individual bridge supports 8 can be vertically set down on the free areas of the fuselage exterior 3 next to the respective aircraft doors 18. In this manner, it is ensured that a clear and unobstructed access to the door area itself is provided, for workers walking along the walking deck 51 of each catwalk 5, without suffering any obstruction by a bridge support 8 in the immediate opening area of each aircraft door 18 and the area adjoining the door that may require assembly installation or outfitting procedures to be carried out thereon. Also, in this manner the supports 8 can be set down on areas of the fuselage reinforced by major structural frames.

Figure 5A:
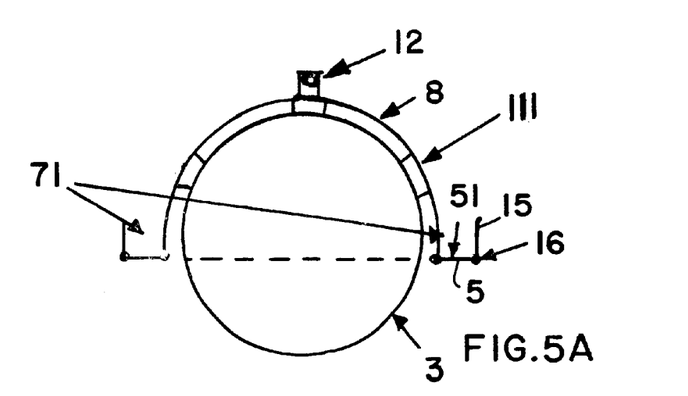
FIGS. 5A and 5B are two sectional views of an aircraft fuselage on two different sectional planes, showing two different arched contours of curved bridge supports respectively matching the two different sectional contours of the fuselage.
Figure 5B:
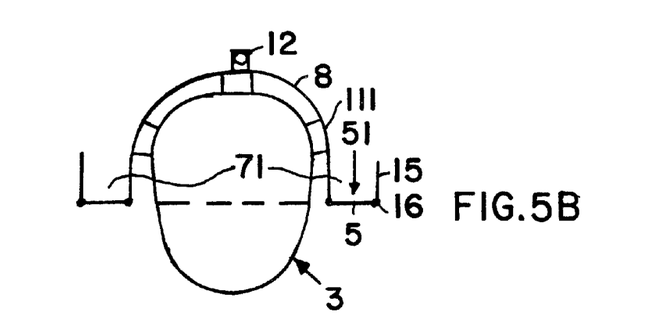

It should be understood that the sectional view shown in FIG. 2 generally applies to any cross-section through the bridge arrangement 1 along a plane on which a respective one of the bridge supports 8 lies. However, since the aircraft fuselage 4 will have a different cross-sectional shape at each respective section plane along its length, the corresponding arched shape of the respective bridge support 8 at a particular sectional plane will be different from those at other sectional planes so as to correspond to the particular shape of the fuselage at that location or plane. For example, FIG. 5A shows a cross-sectional shape of the main fuselage body, and FIG. 5B shows a cross-sectional shape of an aft part of the fuselage of a typical single deck aircraft, with respective different corresponding shapes of the bridge supports 8. It should also be understood that a minimalized configuration of the access bridge 1 would include only a single bridge support 8 supporting an end of one or more catwalks, of which the other end is supported on a fixed level platform 10 provided in the maintenance or assembly hangar. The platform 10 has a fixed height or level, and may have a fixed position or may be mobile to be movable to different positions along the floor of the hangar so that it can support an end of the catwalk or catwalks 5 at different locations along the aircraft fuselage. With such an arrangement, the bridge would not extend entirely along the aircraft fuselage, but would only extend along a particular work zone in which work is to be performed on the fuselage at a given time.

The ends of the catwalks 5 may be provided with male or female type coupling units 14 including a male or female coupling element and the associated operating mechanism for engaging and disengaging the coupling elements. The operating mechanism respectively includes a pneumatic, hydraulic, electrical or mechanical actuator for moving and/or actuating the coupling elements selectively into and out of coupling engagement. Thereby, the catwalks 5 may be coupled to or decoupled from successive catwalks 5 to form longer complete bridge portions or entire bridge arrangements. Also, an end of the catwalks can be coupled to the fixed level work platform 10 mentioned above.

With reference to the embodiment of FIG. 3 and incorporating features from the embodiment of FIG. 1, it is possible to provide a bridge 1 with at least two bridge supports 8 that are set down onto the aircraft fuselage 4. The respective opposite ends of each bridge catwalk 5 may be provided with coupling units 14 in the manner described above, so that a plurality of bridges 1 or bridge portions 11 can be coupled successively to one another along the length of the aircraft fuselage 4 so as to construct a completed, multi-piece bridge 1. The number of bridge portions 11 to be assembled together can be selected as needed, for example, depending the length of the respective aircraft fuselage 4.

As can be seen in FIG. 2, especially the catwalks 5 of the lower catwalk pair 71 are spaced a certain gap distance C3 away from the outer surface of the aircraft fuselage. This arises because of the curvature of the outer surface of the fuselage (as would be seen in a top plan view) so that the preferred straight catwalk 5 will not be equidistant from the outer surface of the fuselage at all points. Even more importantly, such a spacing gap C3 necessarily arises because of the horseshoe or inverted U-shape of the bridge supports 8, whereby the horizontal spacing C1 between the catwalks 5 of the lower pair 71 must be wide enough to pass with a clearance downwardly over the widest portion of the aircraft fuselage cross-section, as the bridge 1 is lowered into position on the fuselage. Thus, when the lower catwalks 5 are in their final position at a level below the widest sectional width of the aircraft fuselage 4, there will necessarily remain a gap C3 between the respective inner edges 17 of the catwalks 5 and the outer surface of the fuselage 4 at this narrower area of the fuselage 4.

In the area of each aircraft door 18, in order to provide a safe access between the catwalk 5 and the interior of the aircraft fuselage through the respective door 18, a tiltable or slidable compensating flap or ramp is provided to span the spacing gap C3 between the inner edge 17 of the catwalk 5 of the lower catwalk pair 71 and the interior of the fuselage. To achieve this, the compensating flap or ramp may be hinged or otherwise secured to the inner edge 17 of the respective catwalk 5, or to an area near the edge 17 on the walking platform 51 of the catwalk 5. In addition to spanning the cap C3, this compensating flap or ramp also compensates for any minor height difference between the walking surface 51 of the catwalk 5 and the door threshold of the respective aircraft door 18. In other cases in which the upper surface and particularly the inner edge 17 of the respective catwalk 5 matches flushly along the upper edge of the door threshold of the aircraft door 18, for example in the case of the catwalks 5 of the upper catwalk pair 72, it is possible to omit such compensating flaps or ramps. In order to avoid height differences between the walking surfaces 51 of the catwalks 5 and the door thresholds, it is important that the vertical spacing A between the walking surfaces 51 of the catwalks 5 on one side of the aircraft corresponds to the vertical threshold spacing B between the thresholds of the upper and lower doors of the aircraft.

In connection with the padding elements 111 discussed above, it should be noted that the distribution, size, number and material of the padding elements must be selected in consideration of the total weight of the bridge 1 or bridge portion 11 as well as the maximum loading weight of persons and materials to be carried on the bridge at any one time. As an alternative embodiment, the padding or cushioning elements 111 may be replaced by respective spacer members, which may be used to support or brace the bridge 1 or bridge portion 11 and hold it in proper position relative to the fuselage exterior 3 if the lifting arrangement coupled to the carrying elements 12 lowers the bridge 1 or bridge portion 11 into a position very close to and nearly resting on the aircraft fuselage 4 but continues to partially support the bridge 1 or bridge portion 11. An adjusting arrangement (not shown) would then move the lifting apparatus in very small incremental steps as much as necessary until the bridge 1 or the bridge segments 131, 132 of the bridge portion 11 are fixed by means of the spacing members into the exact desired position on the aircraft fuselage 4. At this point, positioning legs 151 (see FIG. 2) can be provided to additionally provide a positioning or bracing function between the floor 2 and the lowermost catwalks 5. The positioning legs 151 may be movably connected to the catwalks 5 to allow the legs 151 to be retracted to the catwalks 5 as schematically shown on the left of FIG. 2 and in FIG. 1.

Further details will now be described regarding the individual bridge portion 11 as shown in FIG. 3. The bridge portion 11 is made up of two bridge segments 131 and 132 which are generally constructed in accordance with the bridge 1 as discussed above in connection with FIG. 1. However, the free ends of the catwalks 5 of each bridge segment 131, 132 are provided with male or female coupling units 14, whereby the adjacent bridge segments 131 and 132 are integrated or coupled to each other to form the bridge portion 11. More particularly, each bridge segment 131 and 132 substantially corresponds to a portion of the bridge shown in FIG. 1, including two bridge supports 8 spaced apart from one another by the lengthwise spacing distance S, and a portion of the catwalks 5 that spans between the two bridge supports 8 and protrudes in a lengthwise direction beyond the bridge supports 8. For example, on one end the catwalks may protrude beyond the bridge supports 8 by a rather small length, where the free ends are then terminated in coupling units 14. On the other hand, the opposite ends of the catwalks 5 may protrude a greater extent, for example by a length of up to ½ S, with coupling units 14 provided on the free ends thereof. Thus, a single one of the bridge segments 131 or 132 has a lengthwise length corresponding substantially to 1½ S, for example.

Two of these bridge segments 131 and 132 are then coupled to each other by the respective coupling units 14 to form the bridge portion 11. The bridge portion 11 can be formed of the respective required number of bridge segments 131 and 132 for providing access to the lengthwise portion of an aircraft that requires maintenance or installation work, whereby a relatively short bridge portion 11 may be used if only the end portion of the fuselage, such as the cockpit end or the tail end of the fuselage needs to be accessed.

Another advantage of forming the required bridge portion 11 or an entire multi-piece bridge 1 from a plurality of shorter bridge segments 131 and 132 is that such shorter bridge segments 131 and 132 can be more easily transported and set down onto the fuselage exterior 3 at a predefined location by the overhead lifting apparatus. Namely, the overhead lifting apparatus can individually lift each successive bridge segment 131 or 132, move the respective segment into place and lower it onto the aircraft fuselage 4, and then move a next successive bridge segment into place and lower it onto the aircraft fuselage, whereupon the successive bridge segments are then coupled together by the coupling units 14. Such a construction provides a modular flexibility and adaptability to various sizes and configurations of aircraft fuselages and also allows convenient lifting, transport and positioning of the successive segments.

In the event that a movable overhead crane is not available in the hangar to serve as a lifting apparatus for lifting and moving the bridge 1 or the bridge portion 11 or the individual bridge segments 131 and 132 as described above, then the respective bridge construction may be lifted by one or more simple steel cables. Namely, one or more pulleys or sheaves simply need to be secured to the supporting structure of the roof of the hangar, and one or more steel cables are guided over the pulleys or sheaves so that free ends of the cables are then hooked into the carrying elements or lifting fixtures 12 of the bridge supports 8. The opposite ends of the cables are connected to winches or hoists or the like for lifting the bridge construction. The pulleys may also be secured to movable carriages on rails along the hangar ceiling to provide another degree of mobility. In any case, it is generally not necessary to provide additional structural reinforcement of the hangar ceiling or roof, in view of the relatively low weight of the unloaded bridge structure or individual segments thereof.

To carry out a docking procedure, in other words to position and set the bridge construction (i.e. the bridge 1, the bridge portion 11, or the individual bridge segments 131 and 132) onto the aircraft fuselage 4, the following steps are carried out. The overhead lifting apparatus or cable arrangement supports the bridge construction at a defined vertical spacing in the direction of the fuselage vertical axis 9 above the aircraft fuselage 4, and then preferably horizontally moves the bridge construction in a direction parallel to the aircraft lengthwise axis 6 toward the tail assembly until the bridge construction reaches a prescribed horizontal position relative to the aircraft fuselage door. Instead of moving the bridge construction horizontally by means of the overhead lifting apparatus, or in addition thereto, the aircraft fuselage is then moved forward into a docking position directly below the open parabolic or oval arch of the bridge construction. Finally, the overhead lifting apparatus is operated to lower the bridge construction onto the aircraft fuselage 4 in the proper position thereon.

After the bridge construction has been lowered onto the fuselage, any coupling units that have not yet been coupled respectively to each other, are now coupled together. Also, the ends of the bridge catwalks 5 adjoining the fixed access platform provided in the hangar are now coupled to the fixed platform by means of coupling units so as to provide a secured fixed position of the bridge construction, both in a horizontal direction and in a vertical direction. Finally, the above described tiltable or slidable compensating flaps or ramps are put down into position to bridge the gap C3 between the catwalks 5 of the lower catwalk pair 71 and the door thresholds of the aircraft doors 18 of the aircraft fuselage at this lower level. In this finally docked condition, the bridge construction provides simultaneous access to the desired number of aircraft doors and also the desired portion or the entirety of the exterior of the aircraft fuselage by allowing workers to walk along the catwalks to access the doors and carry out all necessary installations and outfitting operations. The two or more levels of catwalks also provide simultaneous access to the aircraft doors on different decks of a multi-deck aircraft.

The procedure for undocking the aircraft from the bridge constructions or vice versa involves carrying out the reverse of the above docking procedure. Namely, the compensating ramps are tilted up away from the aircraft door thresholds, the coupling units are uncoupled as necessary, for example the bridge construction is uncoupled from the fixed access platform, the bridge construction is then lifted up away from the aircraft fuselage, and then moved horizontally relative to the aircraft or the aircraft is backed away from the bridge construction.

A respective bridge construction may be adapted to a different size or configuration of aircraft, for example having a longer or shorter fuselage length, in the following manner. First, the bridge construction is lowered down onto the floor in a free or unoccupied docking space in an assembly hangar. Then the overhead lifting apparatus is unhooked or otherwise decoupled from the carrying elements 12. Then, additional bridge segments 131, 132, or preassembled bridge portions 11 are coupled onto the existing bridge construction, or alternatively an unneeded number of bridge segments 131, 132 are removed from the previously existing bridge construction. Once the bridge construction has been reconfigured to its new required dimensions or configuration, the overhead lifting apparatus is again coupled to the carrying elements 12, whereupon the bridge construction is lifted up into the proper docking position, and then the next aircraft is docked into the reconfigured bridge construction according to the procedure described above.

The present inventive bridge construction, i.e. the bridge 1, the bridge portions 11, and/or the bridge segments 131 or 132, achieve a very simple docking and undocking procedure as described above, and further achieve particular advantages, as follows. By only slightly lifting the bridge construction up away from the aircraft fuselage, it immediately becomes possible to move the aircraft forwards into a docking position or backwards out of a docking position. For aircraft fuselages or portions thereof that do not have an attached tail assembly, it is possible to move the respective fuselage or fuselage portion backwards into a docking position or forwards out of a docking position with the bridge construction lifted only slightly up away from the fuselage.

The use of the present bridge construction requires only a relatively small lateral correction or movement of the bridge construction relative to the aircraft. In other words, it is not necessary to move the bridge construction laterally away from the aircraft to carry out a docking or undocking procedure. Therefore, the docking spaces or bays for the aircraft do not need to be substantially wider than the aircraft itself. Moreover, any small lateral mismatch between the position of the bridge construction and the position of the aircraft fuselage is substantially automatically corrected in view of the cable-suspended support of the bridge construction and the arched contour of the bridge supports matching and adapting to the outer contour of the aircraft fuselage via the padding or cushioning elements 111. It is not necessary to carry out a very precise directionally limited rolling or driving movement of the aircraft into a parking position as is necessary in prior art fixed or rigid access arrangements, and especially such prior art arrangements that include structures on both sides of the aircraft fuselage with a relatively narrow space therebetween.

The present inventive bridge construction does not require a high scaffolding or supporting structure or any additional stairs or ladders for reaching the walking surfaces of the catwalks. Also, the present bridge construction does not require any specialized apparatus or arrangements for moving the bridge construction relative to the aircraft. For these reasons, the bridge construction can be fabricated in an extremely lightweight and relatively flat (i.e. low structural height) manner. the resulting light weight and low height of the overall bridge construction makes it possible to use a conventional or previously available overhead crane for lifting and moving the bridge construction within the aircraft assembly hangar. There is no need to provide a specialized, complicated and high strength overhead lifting arrangement.

The present bridge construction also avoids or overcomes any level differences between the access arrangement and the door threshold levels of the aircraft, when the aircraft is supported on its landing gear. Namely, depending on the particular loading condition of the landing gear and other factors such as tire inflation and the like, the aircraft door thresholds will be at slightly different heights above the floor of the assembly hangar. Prior art access arrangements would therefore suffer level differences between the access platforms and the door thresholds. In comparison, since the present inventive bridge construction is set down onto the aircraft fuselage, the bridge construction is always necessarily and automatically adjusted to the prevailing vertical position of the aircraft fuselage, regardless of the height of the fuselage above the hangar floor. In other words, the vertical height of the present bridge construction is directly fixed relative to the height of the aircraft fuselage itself, rather than being set relative to the floor or the ceiling of the hangar.

Storing the present bridge construction when it is not being used is also very simple, in view of the lightweight and compact structure of the present bridge construction. First of all, the several bridge segments may be easily decoupled for storage. Secondly, the bridge construction can be most simply stored by being elevated overhead into a storage or waiting position just below the roof or ceiling of the assembly hangar. Alternatively, the bridge construction or component part thereof may be stored on the floor of the hangar at locations beside the aircraft fuselage, or even directly under the aircraft fuselage.

As also described above, the bridge construction can easily be adapted or reconfigured to be used with different versions, configurations or sizes of aircraft. The construction time and costs for assembly of the present bridge construction are very low in comparison to the prior art. The time involved in the docking and undocking procedures is also significantly improved relative to the prior art. Also, since the present bridge construction is not supported by transport arrangements that must roll over the hangar floor, there are no particular additional requirements that the floor be especially smooth, level and strong for bearing additional loads. Although additional loads will be applied to the aircraft fuselage and thus through the landing gear onto the floor, these additional loads are relatively small in view of the lightweight structure of the bridge construction, and the floor in the center area of the docking space is typically built with a sufficiently high strength to accommodate the weight of different sizes of aircraft being supported on their respective landing gear on the central area of the hangar floor.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A combination of an aircraft fuselage and an access bridge arrangement for enabling persons to access said fuselage on said bridge arrangement, wherein said bridge arrangement comprises:
   at least one bridge support respectively comprising a structural supporting arch having a curved arched configuration that extends over a top of said fuselage from a right side to a left side of said fuselage on a plane perpendicular to a lengthwise axis of said fuselage, and contact elements that contact an exterior surface of said fuselage; and
   at least one catwalk that extends respectively along one of said sides of said fuselage parallel to said lengthwise axis of said fuselage and that is connected to and supported by said structural supporting arch of said at least one bridge support;
   wherein said at least one bridge support is set down onto said fuselage so that said contact elements bear against said exterior surface of said fuselage with at least a part of a total weight of said access bridge arrangement so as to brace and positively fix a position of said access bridge arrangement on and relative to said fuselage, and to support at least said part of said total weight on said fuselage.

2. The combination according to claim 1, wherein said contact elements of said at least one bridge support contact said exterior surface of said fuselage so as to brace and position said bridge arrangement relative to said fuselage without supporting said total weight of said access bridge arrangement on said fuselage.

3. The combination according to claim 1, wherein said contact elements of said at least one bridge support contact said exterior surface of said fuselage so as to transfer said total weight of said access bridge arrangement onto said fuselage and to support said total weight on said fuselage.

4. The combination according to claim 1, wherein said at least one catwalk comprises a first left catwalk that extends along said left side of said fuselage and a first right catwalk that extends along said right side of said fuselage, wherein said arched configuration of said structural supporting arch of said at least one bridge support respectively has an inverted U-shape including a top arch and left and right side legs extending downwardly from said top arch respectively on said left side and said right side of said fuselage, and wherein said first left catwalk and said first right catwalk are respectively connected to and supported by said left side leg and said right side leg of said structural supporting arch of said at least one bridge support.

5. The combination according to claim 4, wherein said at least one catwalk further comprises a second left catwalk that extends along said left side of said fuselage spaced above said first left catwalk and a second right catwalk that extends along said right side of said fuselage spaced above said first right catwalk, and wherein said second left and second right catwalks are respectively connected to and supported by said left side leg and said right side leg of said structural supporting arch of said at least one bridge support.

6. The combination according to claim 1, wherein said contact elements comprise padding elements that are arranged between said supporting arch and said exterior of said fuselage and that contact said exterior of said fuselage.

7. The combination according to claim 1, wherein said at least one bridge support respectively further comprises a lifting fixture connected to said supporting arch at a top thereof, and further comprising an overhead lifting cable connected to said lifting fixture and adapted to lift said bridge support.

8. A mobile access bridge for providing unobstructed access for persons and for goods to a door and an exterior surface of a stationary aircraft fuselage, comprising:
   first and second catwalks of a first catwalk pair that extend horizontally and parallel to each other respectively on opposite sides of the aircraft fuselage in a direction parallel to a lengthwise axis of the aircraft fuselage, and
   a plurality of curved bridge supports that respectively comprise structural supporting arches that extend along planes perpendicular to the lengthwise axis of the aircraft fuselage and that are spaced apart from one another along the lengthwise axis of the aircraft fuselage, and respectively further comprise contact elements that contact an exterior surface of the fuselage,
   wherein said structural supporting arches respectively have curved arch configurations with arch curvatures that respectively match exterior contours of the exterior surface of the aircraft fuselage at respective cross-sections on the planes perpendicular to the lengthwise axis of the aircraft fuselage,
   wherein said structural supporting arches are connected to and support said first and second catwalks at locations spaced apart along a length of said catwalks respectively, and
   wherein said bridge supports are set down onto the fuselage so that said contact elements bear against the exterior surface of the fuselage with at least a part of a total weight of said access bridge so as to brace and positively fix a position of said access bridge on and relative to the fuselage, and to support at least said part of said total weight on the fuselage.

9. The mobile access bridge according to claim 8, wherein said respective structural supporting arches of respective ones of said bridge supports respectively have different shapes of said arch curvatures to respectively match different shapes of the exterior contours of the aircraft fuselage respectively at the cross-sections which are spaced apart along the lengthwise axis of the aircraft fuselage.

10. The mobile access bridge according to claim 8, further comprising third and fourth catwalks of a second catwalk pair that extend horizontally and parallel to each other and parallel to said first and second catwalks and that are respectively spaced above said first and second catwalks on the opposite sides of the aircraft fuselage.

11. The mobile access bridge according to claim 10, wherein said first and second catwalks are interrupted at an area at which an aircraft wing is connected to the aircraft fuselage or are shaped to match a contour of the aircraft wing at said area.

12. The mobile access bridge according to claim 8, wherein said catwalks are secured to said structural supporting arches, at respective ends of said structural supporting arches or at segments along respective lengths of said structural supporting arches.

13. The mobile access bridge according to claim 8, wherein respective opposite ends of each one of said catwalks are secured to at least two of said curved bridge supports.

14. The mobile access bridge according to claim 8, further comprising a fixed level work platform that is fixedly positioned above a floor on which the aircraft is supported, and wherein at least one end of each of said catwalks is positionally fixedly secured to said fixed level work platform.

15. The mobile access bridge according to claim 8, wherein said contact elements comprise padding elements respectively arranged spaced apart from one another respectively on an inner circumference of said arch curvature of each one of said structural supporting arches, and wherein said padding elements support said mobile access bridge against the exterior surface of the aircraft fuselage under the effect of said total weight of said mobile access bridge.

16. The mobile access bridge according to claim 8, wherein each one of said bridge supports further comprises at least one lifting fixture that is respectively secured to said structural supporting arch centered at a midpoint of an outer perimeter length of said structural supporting arch, and further in combination with an autonomous overhead lifting apparatus and a lifting cable that connects said overhead lifting apparatus to said at least one lifting fixture, and wherein said overhead lifting apparatus is adapted to selectively lift said access bridge and set said access bridge down onto the aircraft fuselage via said lifting cable.

17. The mobile access bridge according to claim 16, wherein said at least one lifting fixture comprises a plurality of lifting fixtures secured to said structural supporting arch spaced apart from one another along said perimeter length and centered at said midpoint.

18. The mobile access bridge according to claim 16, further comprising positioning legs located at fixed locations on a supporting floor, wherein said catwalks that are adjacent to the floor are positioned on said positioning legs relative to the floor in a condition wherein said access bridge has been lowered nearly onto the aircraft fuselage by said autonomous overhead lifting apparatus coupled to said at least one lifting fixture by said lifting cable.

19. The mobile access bridge according to claim 18, wherein said positioning legs are movably connected to said catwalks that are adjacent to the floor, so that said positioning legs can be retracted to said catwalks that are adjacent to the floor when said positioning legs are not needed for a positioning function.

20. The mobile access bridge according to claim 8, made up of a plurality of bridge segments coupled to one another, wherein each one of said bridge segments comprises a respective pair of said first and second catwalks and at least two of said curved bridge supports connected to and supporting said respective pair of said catwalks.

21. The mobile access bridge according to claim 20, wherein two of said bridge supports are respectively connected to respective ends of said catwalks of said respective pair, and wherein at least an additional one of said bridge supports is connected to an intermediate span of each one of said catwalks of said respective pair between said ends of said catwalks.

22. The mobile access bridge according to claim 20, further comprising mechanical coupling units arranged on respective opposite facing ends of said catwalks, wherein said bridge segments are successively coupled to one another by said coupling units.

23. The mobile access bridge according to claim 8, wherein each said catwalk comprises an unobstructed horizontal catwalk deck and a safety railing secured to and protruding upwardly from an edge of said catwalk deck that is oriented away from the aircraft fuselage.

24. The mobile access bridge according to claim 8, wherein said catwalks respectively comprise horizontal catwalk decks, and wherein said catwalks are positioned so that upper surfaces of said catwalk decks are substantially flush on horizontal planes with upper edges of door thresholds of the aircraft fuselage.

25. The mobile access bridge according to claim 10, wherein the aircraft fuselage has door openings on two different height levels and wherein said first and second catwalks of said first catwalk pair are arranged horizontally flush on a lower one of the different height levels and said third and fourth catwalks of said second catwalk pair are arranged horizontally flush on a higher one of the different height levels so that respective walking decks of said catwalks are respectively substantially flush with thresholds of the door openings.

26. The mobile access bridge according to claim 25, comprising at least two bridge segments that are coupled to each other and that each respectively comprise said first catwalk, said second catwalk, said third catwalk and said fourth catwalk and at least two of said bridge supports, and wherein each one of said bridge segments has the same length parallel to the lengthwise axis of the aircraft fuselage.

27. The mobile access bridge according to claim 26, wherein said length of one of said bridge segments is sufficient so that said bridge segment provides access to at least one of the door openings of the aircraft.

28. The mobile access bridge according to claim 8, wherein said contact elements comprise spacer elements respectively arranged spaced apart from one another respectively on an inner circumference of said arch curvature of each one of said structural supporting arches, each one of said bridge supports further comprises at least one lifting fixture that is secured to said structural supporting arch centered at a midpoint of an outer perimeter length of said structural supporting arch and that is adapted to be coupled to an autonomous overhead lifting apparatus, and said spacer elements are braced and supported in contact against the exterior surface of the aircraft fuselage in a condition in which the overhead lifting apparatus has lowered said access bridge nearly onto the aircraft fuselage, and further comprising an adjusting apparatus that adjusts a relative position of said access bridge on the aircraft fuselage until a required position thereof is reached and fixed by said spacer elements contacting against the exterior surface of the aircraft.

29. The mobile access bridge according to claim 8, wherein said catwalks have a sufficient length in said direction parallel to the lengthwise axis of the aircraft fuselage so that a respective one of said catwalks extends to and accesses at least two door openings of the aircraft fuselage.

\* \* \* \* \*